G. C. BOWEN.
HEATING DEVICE FOR TANK CARS.
APPLICATION FILED NOV. 6, 1917.
1,274,504.
Patented Aug. 6, 1918.
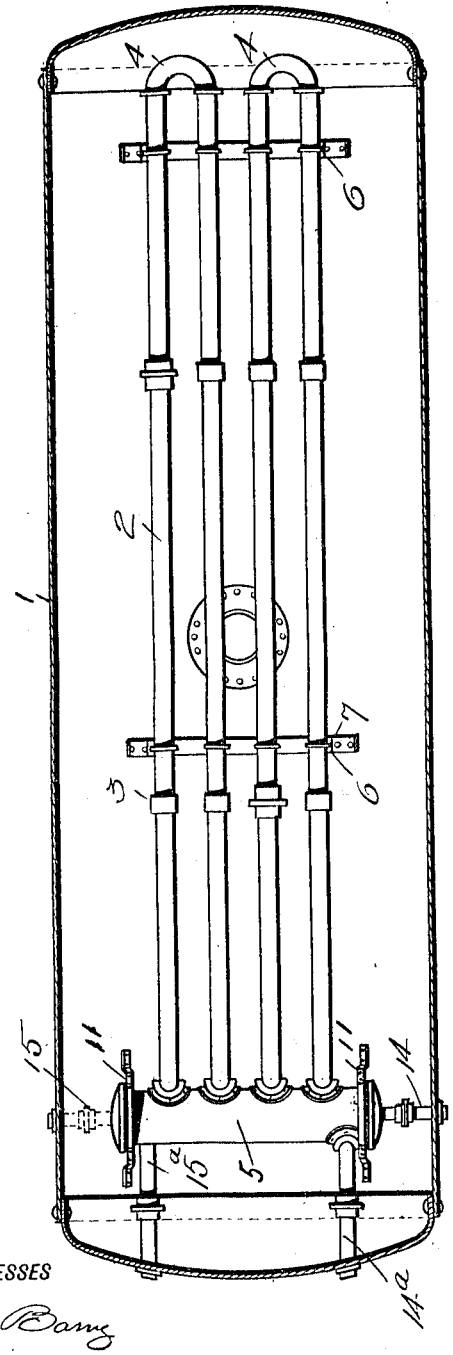
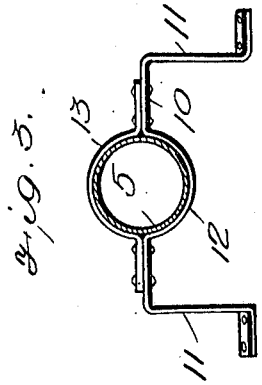
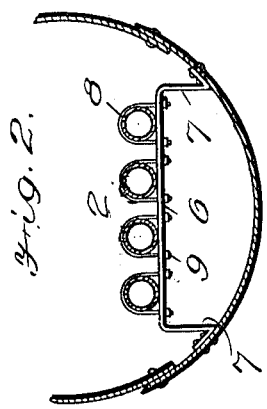
WITNESSES
INVENTOR
Grover C. Bowen
BY
ATTORNEYS

UNITED STATES PATENT OFFICE.

GROVER CLEVELAND BOWEN, OF COFFEYVILLE, KANSAS.

HEATING DEVICE FOR TANK-CARS.

1,274,504.  Specification of Letters Patent.  Patented Aug. 6, 1918.

Application filed November 6, 1917. Serial No. 200,589.

*To all whom it may concern:*

Be it known that I, GROVER CLEVELAND BOWEN, a citizen of the United States, and a resident of Coffeyville, in the county of Montgomery and State of Kansas, have invented certain new and useful Improvements in Heating Devices for Tank-Cars, of which the following is a specification.

My invention is an improvement in heating devices for tank cars, and has for its object to provide a simple, inexpensive device of the character specified, which may be easily installed and which cannot slip or become loose, wherein the heat is evenly distributed and wherein the inlet and outlet may be at the end or sides of the car.

In the drawings:

Figure 1 is a horizontal section through a tank car showing the device installed;

Fig. 2 is a transverse vertical section; and

Fig. 3 is a sectional view through a manifold, showing the cradle for supporting the same.

The present embodiment of the invention is shown in connection with the body 1 of a tank car, and the heating device consists of a series of pipes arranged alongside each other, each pipe being composed of pipe sections 2 which are connected by unions 3. The pipes are arranged longitudinally of the tank, and each pipe consists of three sections. The intermediate section has its ends connected with the adjacent end sections, and the end sections of the adjacent lengths at one end of the tank are connected by curved sections or elbows 4.

In the present instance, four pipes are used, and each outer pipe is connected to the adjacent inner pipe by one of the elbows 4. The end sections at the opposite end of the car are connected to the manifold 5, which is supported in a manner to be presently described. The pipes are supported by substantially yoke shaped brackets, each consisting of a body 6 and arms 7. The yokes are arranged with their bodies transversely of the tank and with the arms connected to the tank. U-shaped clips 8 are passed over the pipe sections, the bodies of the clips being transverse to the sections and the arms of the clips extending through openings in the bodies of the yokes, and the said arms of the clips are engaged by nuts 9.

The manifold is supported by two cradles shown more particularly in Fig. 3. Each of these cradles comprises a yoke shaped section consisting of a body 10 and arms 11, the arms being secured to the bottom of the tank, and the body has a depression 12 intermediate its ends shaped to fit and receive the manifold. The other section 13 fits over the manifold, and has its ends riveted to the body of the lower section at each side of the manifold.

As shown, the manifold is provided with inlets 14 and $14^a$, and with outlets 15 and $15^a$. The inlets connect with the ends of the manifold and the outlets lead from the bottom. It will be understood that the inlets and outlets may be at either end.

I claim:

In a tank car, a heating device for the tank, comprising a series of pipes arranged in spaced relation and substantially parallel, the pipes being connected in pairs at one end of the car, a manifold at the other end to which the pipes are connected, said manifold extending transversely of the car, and the pipes extending longitudinally of the car, brackets for supporting the pipes secured to the car, each bracket comprising a yoke shaped member consisting of a body extending transversely of the pipes beneath the same and arms connected to the tank, clips engaging over the individual pipes and detachably connected with the body of the yoke, and cradles for supporting the manifold, said manifold having an inlet and an outlet extending through the wall of the tank.

GROVER CLEVELAND BOWEN.

Witnesses:
A. S. NEWMAN,
R. H. NEWMAN.

Copies of this patent may be obtained for five cents each, by addressing the "Commissioner of Patents, Washington, D. C."